United States Patent
Yu et al.

(10) Patent No.: US 8,333,431 B2
(45) Date of Patent: Dec. 18, 2012

(54) LUMBAR SUPPORTING DEVICE FOR VEHICLE

(75) Inventors: Sang Uk Yu, Seoul (KR); Young Dong Kim, Seongnam-si (KR); Chan Ki Cho, Gwangju (KR)

(73) Assignees: Hyundai Motor Company, Seoul (KR); Kia Motors Corp., Seoul (KR); Dae Chang Seat Co., Ltd., Gyeongju (KR)

( * ) Notice: Subject to any disclaimer, the term of this patent is extended or adjusted under 35 U.S.C. 154(b) by 102 days.

(21) Appl. No.: 12/824,814

(22) Filed: Jun. 28, 2010

(65) Prior Publication Data

US 2011/0127817 A1    Jun. 2, 2011

(30) Foreign Application Priority Data

Nov. 30, 2009    (KR) ........................ 10-2009-0116816

(51) Int. Cl.
*B60N 2/66*    (2006.01)
*A47C 7/46*    (2006.01)

(52) U.S. Cl. .................................. 297/284.4; 297/284.7

(58) Field of Classification Search ............... 297/284.4, 297/284.7
See application file for complete search history.

(56) References Cited

U.S. PATENT DOCUMENTS

| | | | |
|---|---|---|---|
| 6,431,648 B1 * | 8/2002 | Cosentino et al. | 297/284.4 |
| 6,536,840 B1 * | 3/2003 | Schuster et al. | 297/284.4 |
| 6,616,227 B2 * | 9/2003 | Blendea et al. | 297/284.4 |
| 6,676,214 B2 * | 1/2004 | McMillen et al. | 297/284.4 |
| 6,893,089 B2 * | 5/2005 | McMillen et al. | 297/284.4 X |

FOREIGN PATENT DOCUMENTS

KR    10-0803031 B1    2/2008

* cited by examiner

*Primary Examiner* — Anthony D Barfield
(74) *Attorney, Agent, or Firm* — Morgan, Lewis & Bockius LLP

(57) ABSTRACT

A lumbar supporting device for a vehicle, may include an actuator, a lumbar plate slidably mounted to a seat back frame of the vehicle, and having a lumbar support part, wherein the lumbar support part is formed between upper and lower ends of the lumbar plate, and a driving unit coupled to the actuator and pulling both upper and lower portions of the lumbar plate together towards the lumbar support part, using power transmitted from the actuator.

11 Claims, 5 Drawing Sheets

LUMBAR SUPPORTING DEVICE FOR VEHICLE

CROSS-REFERENCE TO RELATED APPLICATIONS

The present application claims priority to Korean Patent Application Number 10-2009-0116816 filed on Nov. 30, 2009, the entire contents of which application is incorporated herein for all purpose by this reference.

BACKGROUND OF THE INVENTION

1. Field of the Invention

The present invention relates, in general, to lumbar supporting devices for vehicles and, more particularly, to a lumbar supporting device for a vehicle, which simultaneously pulls both the upper and lower ends of a lumbar plate towards a lumbar support part when a lumbar support is in operation to always keep the lumbar support part at a constant position without changing position, thus optimally maintaining a passenger's posture, reducing the number of parts, and simplifying the construction, therefore reducing manufacturing cost and increasing operating speed.

2. Description of Related Art

Generally, the seats of a vehicle are divided into front and rear seats.

The front seat is mounted to be pulled forwards or pushed backwards according to the driving habit and body condition of a seated driver and the body condition of a passenger who is sitting in the rear seat. Such a front seat is provided with a seat back to comfortably support the driver's back.

A seat back frame and a lumbar support are installed in the seat back. The lumbar support is mounted to the seat back frame to comfortably support a passenger's loins.

Generally, such a lumbar support is designed biomechanically to comfortably support the passenger's lumbar.

As shown in FIG. 1, a conventional lumbar supporting device for a vehicle includes a lumbar plate 1, a plate spring 3, and a wire 5.

When the wire 5 is pulled by external power, the plate spring 3 is bent, so that the lumbar plate 1 protrudes. A passenger's loins are supported by the protruding lumbar plate 1.

Generally, in the conventional lumbar supporting device for the vehicle, the lower end of the lumbar plate 1 is fixed. In this state, a side of the lumbar plate 1 is pulled by the wire 5.

Thus, the conventional lumbar supporting device is problematic in that the protruding part of the lumbar plate 1 for supporting the passenger's loins may fluctuate up or down.

If the protruding part of the lumbar plate 1 fluctuates, the passenger's loins cannot be supported at a correct position, thus inconveniencing the passenger, therefore deteriorating ride comfort.

Further, the conventional lumbar supporting device for the vehicle is problematic in that the number of parts is large and the construction is complicated, so that the conventional lumbar supporting device is applied to only medium and large vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a lumbar supporting device for a vehicle, in which a driving unit simultaneously pulls both the upper and lower ends of a lumbar plate towards a lumbar support part so that the position of the lumbar support part of the lumbar plate is not changed when a lumbar support is in operation, thus optimally supporting a passenger's loins, increasing the operating speed of the lumbar supporting device, and simplifying the construction, therefore reducing manufacturing cost.

In an aspect of the present invention, the lumbar supporting device for a vehicle, may include an actuator, a lumbar plate slidably mounted to a seat back frame of the vehicle, and having a lumbar support part, wherein the lumbar support part is formed between upper and lower ends of the lumbar plate, and a driving unit coupled to the actuator and pulling both upper and lower portions of the lumbar plate together towards the lumbar support part, using power transmitted from the actuator, wherein the lumbar support part is more elastic than the other portion of the lumbar plate.

The driving unit may include a center wheel rotatably mounted to the lumbar plate under the lumbar support part thereof; a driving cable connected at a first end thereof to the actuator and at a second end thereof engaged with an outer circumference of the center wheel and connected to the lower portion of the lumbar plate, and a connecting unit connecting a portion of the outer circumference of the center wheel to the upper portion of the lumbar plate.

In another aspect of the present invention, the lumbar supporting device may further include a support frame connected to the seat back frame, wherein an upper portion of the support frame is slidably coupled to the upper portion of the lumber plate and a lower portion of the support frame is slidably coupled to the lower portion of the lumber plate, and wherein the center wheel is mounted to the support frame between the upper and lower portions of the lumber plate under the lumbar support part, wherein a bracket having a fastening part protruding therefrom is mounted to the support frame, and the center wheel has a shape of a cylinder which is open at a center thereof to be rotatably fitted to the fastening part, wherein the support frame includes a bending portion under the lumbar support part and the bracket is coupled thereto, and wherein the driving cable is engaged with the bracket and the center wheel along the lumbar support part and reaches the lower portion of the lumbar plate.

The connecting unit may be made of an elastic material, wherein the connecting unit includes a coil spring.

The connecting unit may include a connecting wire coupled at a first end thereof to the portion of the outer circumference of the center wheel, and a coil spring, a first end of which is coupled to a second end of the connecting wire, and a second end of which is connected to the upper portion of the lumbar plate, wherein the second end of the connecting wire is formed of a first hook and the coil spring includes the first end having a second hook which engages with the first hook of the connecting wire.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
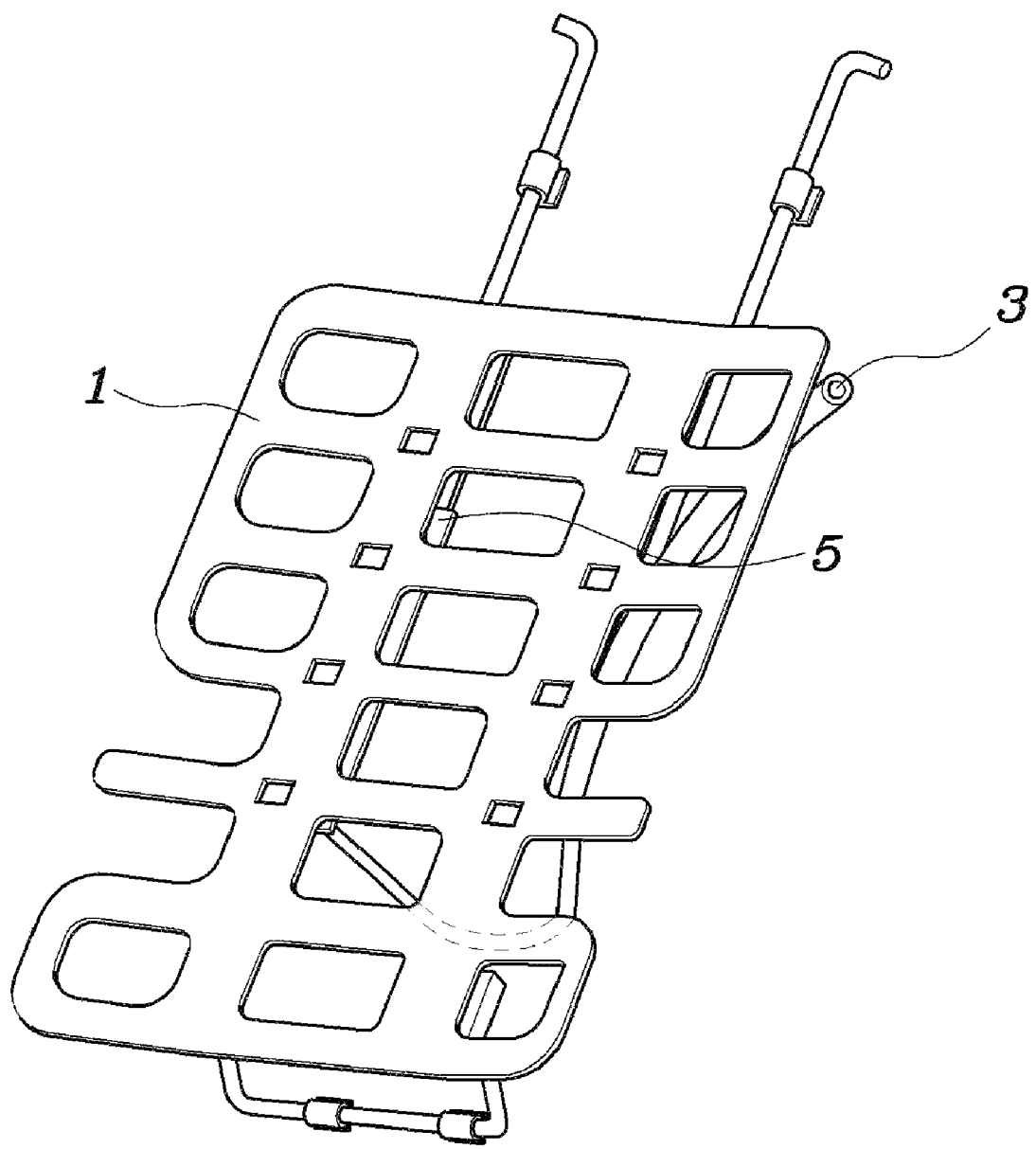
FIG. 1 is a perspective view illustrating a conventional lumbar supporting device for a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
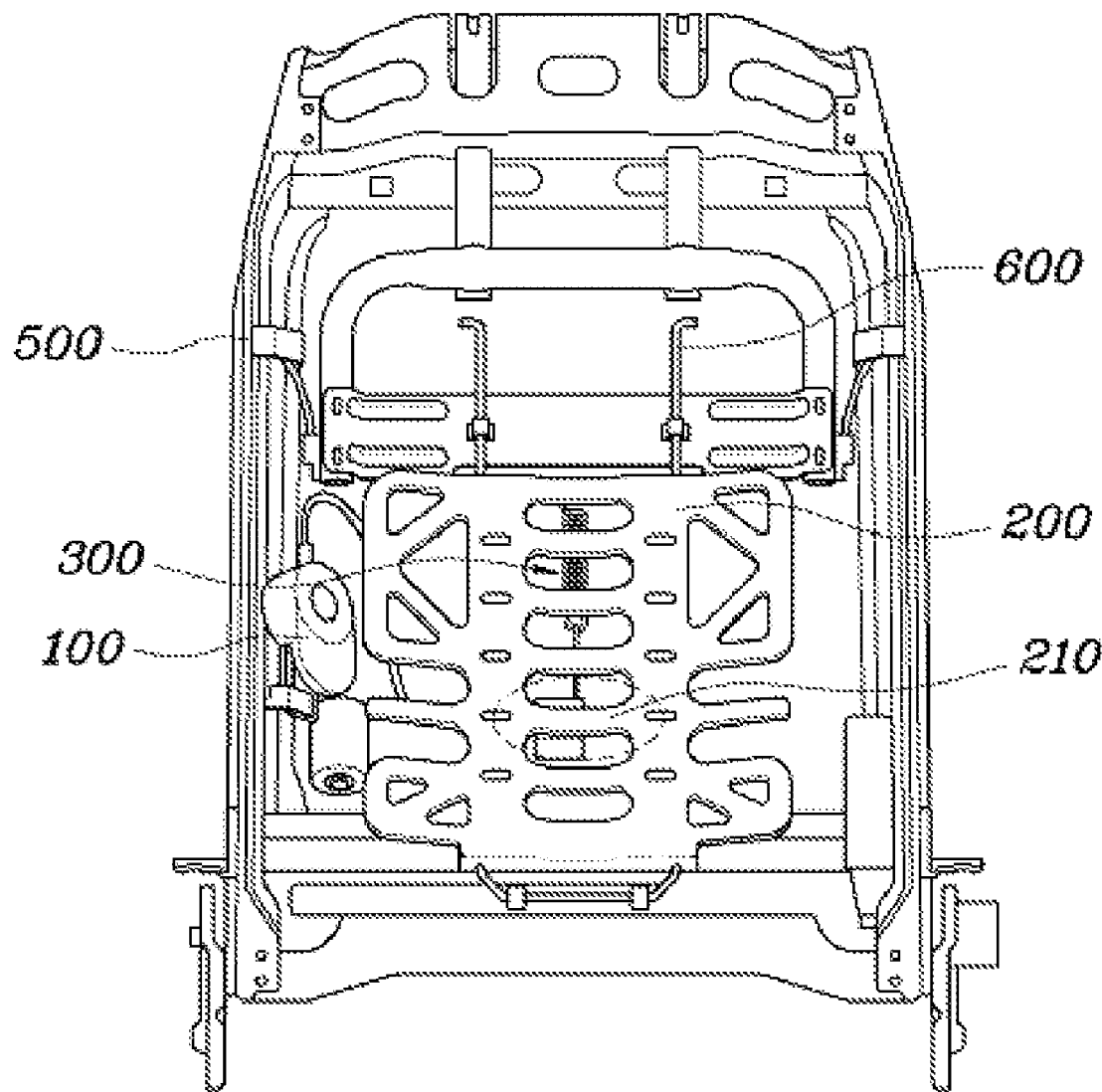
FIG. 2 is a perspective view illustrating an exemplary lumbar supporting device for a vehicle according to the present invention.

FIG. 2 is a view illustrating a lumbar supporting device for a vehicle according to an exemplary embodiment of the present invention.

As shown in FIG. 2, the lumbar supporting device for the vehicle includes an actuator 100, a lumbar plate 200 and a driving unit 300.

The lumbar plate 200 may be made of a flexible material.

The lumbar plate 200 is mounted to a seat back frame 500 of the vehicle to support a passenger. Air holes are formed in the lumbar plate 200 to permit the passage of cold or hot air in summer or winter.

Further, a lumbar support part 210 is provided on the lumbar plate 200 to support a passenger's lumbar, and protrudes in response to the operation of the actuator 100.

The driving unit 300 functions to pull both the upper and lower ends of the lumbar plate 200 together towards the lumbar support part 210, using power transmitted from the actuator 100, thus making the lumbar support part 210 of the lumbar plate 200 protrude.

According to an exemplary embodiment of the present invention, both the upper and lower ends of the lumbar plate 200 are simultaneously moved. Thus, the upper end of the lumbar plate 200 moves downwards, while the lower end of the lumbar plate 200 moves upwards. Such a construction allows the lumbar support part 210 to protrude while maintaining a constant position without changing position.

That is, while the lumbar support part 210 always maintains a position corresponding to the lumbar vertebra of a human body, the lumbar support part 210 may protrude.

Figure 3:
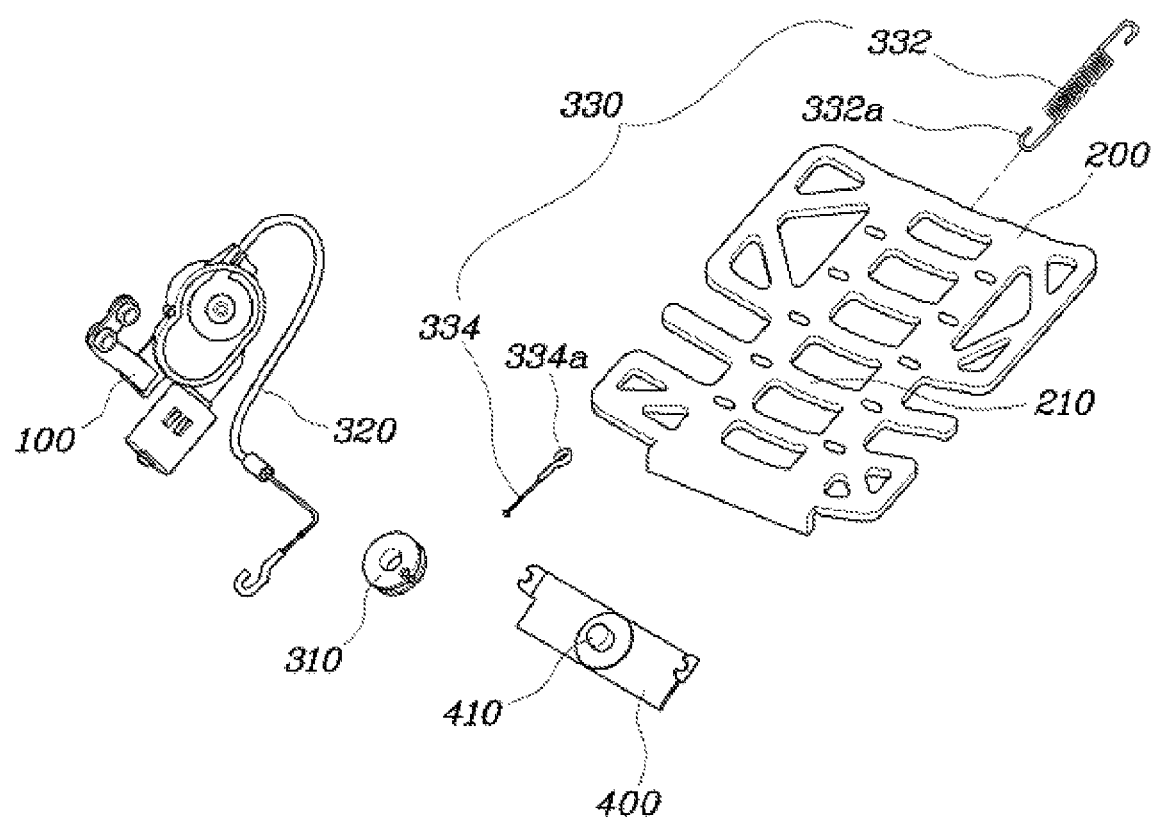
FIG. 3 is an exploded perspective view illustrating the exemplary lumbar supporting device for the vehicle according to the present invention.

FIG. 3 is an exploded perspective view illustrating the lumbar supporting device for the vehicle according to an exemplary embodiment of the present invention.

As shown in FIG. 3, the driving unit 300 may include a center wheel 310, a driving cable 320, and a connecting unit 330.

The center wheel 310 is rotatably mounted under the lumbar support part 210 as explained later.

Further, one end of the driving cable 320 is connected to the actuator 100, while the other end passes through the outer circumference of the center wheel 310 and is connected to the lower end of the lumbar plate 200.

Such a driving cable 320 may be wound around the outer circumference of the center wheel 310 to more efficiently transmit force from the actuator 100 to the center wheel 310.

The connecting unit 330 connects a portion of the outer circumference of the center wheel 310 to the upper end of the lumbar plate 200.

Since the actuator 100 is placed to a side of the lumbar plate 200 and one end of the driving cable 320 is connected to the actuator 100, the driving cable 320 is installed to pass through the side of the lumbar plate 200 and the center wheel 310 and reach the lower end of the lumbar plate 200.

In this case, the actuator 100 and the driving cable 320 do not interfere with the air holes formed in the lumbar plate 200, thus preventing a reduction in the efficiency of cooling or heating the seat in summer or winter.

Meanwhile, in order to more efficiently mount the center wheel 310 to the lumbar plate 200, it is preferable that a bracket 400 be mounted to a support frame 600 connected to the seat back frame 500 and the upper and lower portions of the lumbar plate 200 may be slidably coupled to the support frame 600. The center wheel 310 may be rotatably coupled to the bracket 400. The support frame 600 may include a bending portion 610 to receive the bracket 400 therein and the bending portion 610 is formed under the lumbar support part 10. In this structure, the upper and lower portions of the lumbar plate 200 may move towards the lumbar support part 210 while the bracket 400 including the center wheel 310 is fastened to the seat back frame 500.

The bracket 400 includes a fastening part 410 protruding therefrom. When the center wheel 310 is manufactured to have the shape of a cylinder which is open at its center and is coupled to the fastening part 410, the center wheel 310 may be coupled to the fastening part 410 in such a way as to rotate about the fastening part 410.

The connecting unit 330 may be manufactured using an elastic material. In order to have elasticity, the connecting unit 330 may include a coil spring 332 having an elastic force.

The extent of protrusion of the lumbar plate 200 is determined by the operation of the actuator 100. However, it is substantially impossible to adjust the length of the connecting unit 330 according to the extent of protrusion of the lumbar plate 200.

Thus, the connecting unit 330 may be made of a material having flexibility or elasticity. Further, in the case of using the coil spring 332, the lumbar supporting device for the vehicle may be efficiently constructed regardless of the extent of protrusion of the lumbar plate 200.

Further, even when the lumbar supporting device for the vehicle is abruptly operated, the connecting unit 330 may perform a shock absorbing function.

In order to improve the efficiency of assembling work and make it easy to disassemble the lumbar supporting device for the vehicle when it is out of order, the connecting unit 330 may further include a connecting wire 334 which is coupled at one end thereof to a portion of the outer circumference of the center wheel 310 and has at the other end thereof a first hook 334a.

Further, after a second hook 332a is formed on one end of the coil spring 332 to engage with the first hook 334a, the other end of the coil spring 332 is coupled to the upper end of the lumbar support.

Figure 4:
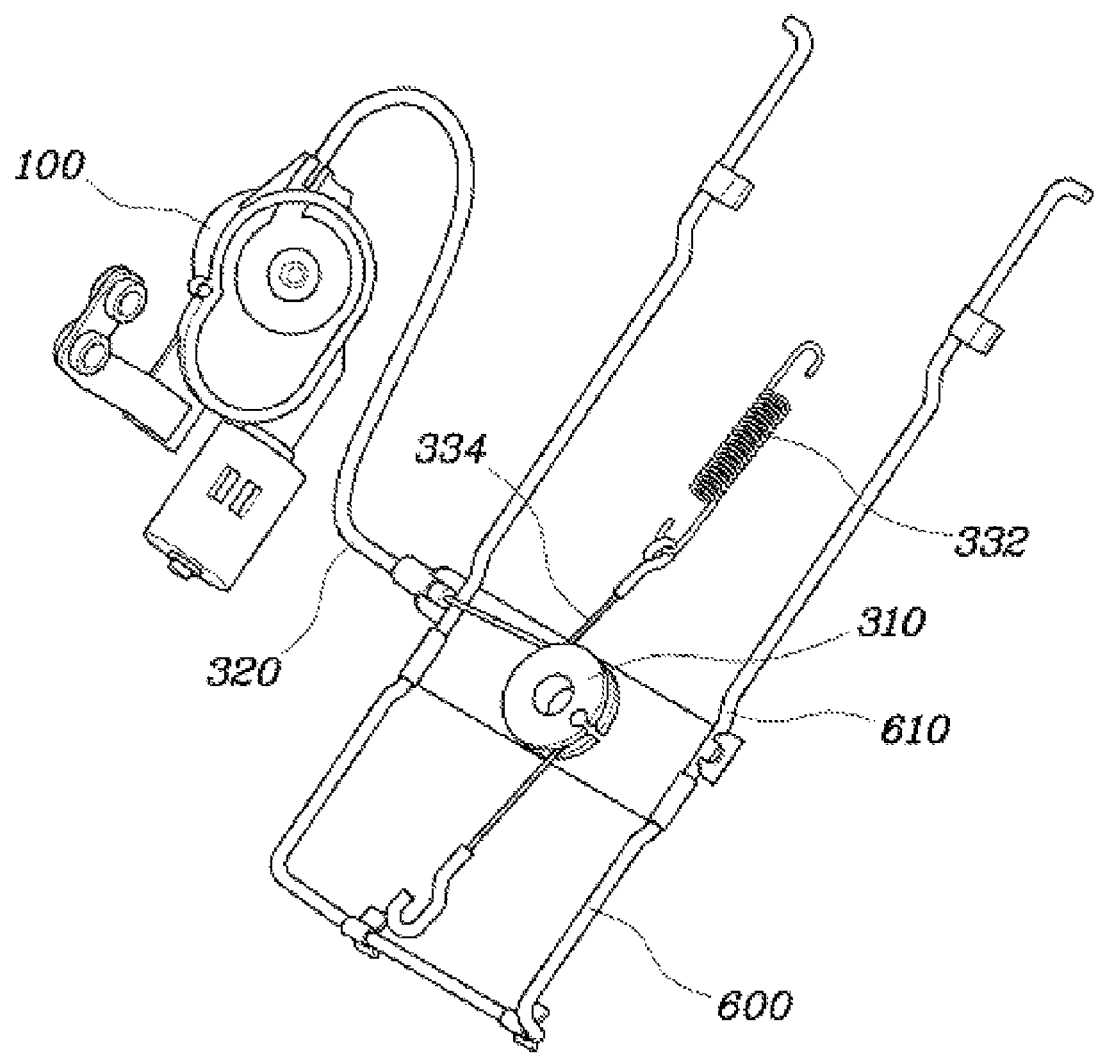
FIG. 4 is a detailed view illustrating a driving unit of the exemplary lumbar supporting device for the vehicle according to the present invention.

FIG. 4 is a detailed view illustrating the driving unit of the lumbar supporting device for the vehicle according to an exemplary embodiment of the present invention.

The operation of the lumbar supporting device for the vehicle according to an exemplary embodiment of the present invention will be described with reference to FIG. 4.

The actuator 100 is operated to pull the driving cable 320. By a force of the actuator 100 pulling the driving cable 320, the center wheel 310 is rotated, and simultaneously, the lower end of the lumbar plate 200 (see FIG. 3) coupled to the other end of the driving cable 320 is moved while being pulled towards the lumbar support part 210 (see FIG. 3).

Further, as soon as the lower end of the lumbar plate 200 moves, the connecting wire 334 is wound around the outer circumference of the center wheel 310 by the rotation of the center wheel 310.

At this time, the coil spring 332 is extended, thus pulling the upper end of the lumbar plate 200 towards the lumbar support part 210.

Consequently, as the actuator 100 is operated, both the upper and lower ends of the lumbar plate are simultaneously pulled towards the lumbar support part 210.

Figure 5:
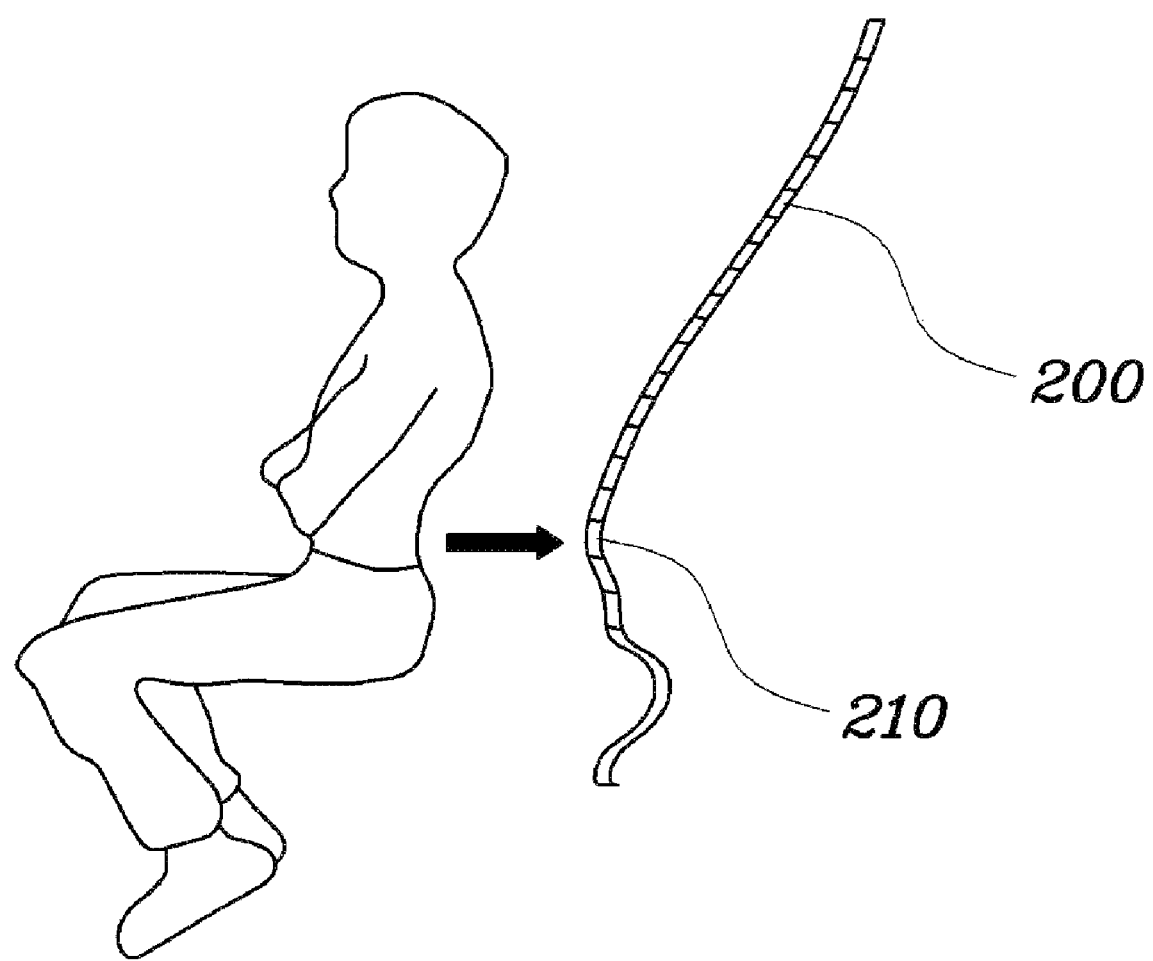
FIG. 5 is a schematic view illustrating the effect of the exemplary lumbar supporting device for the vehicle according to the present invention.

FIG. 5 is a schematic view illustrating the effect of the lumbar supporting device for the vehicle according to an exemplary embodiment of the present invention.

As shown in FIG. 5, both the upper and lower ends of the lumbar plate 200 are simultaneously pulled towards the lumbar support part 210 of the lumbar plate 200.

Thus, in the state where the position of the lumbar support part 210 is fixed, the lumber support part 210 protrudes.

Therefore, a passenger's loins can be optimally supported, so that his or her posture is optimally maintained and the passenger feels comfortable.

Moreover, the speed of protruding the lumbar plate 200 by simultaneously pulling both the upper and lower ends of the lumbar plate 200 is faster than the speed of protruding the lumbar plate 200 by pulling the lumbar plate 200 only in one direction.

As described above, the present invention provides a lumbar supporting device for a vehicle, in which a lumbar support part of a lumbar plate is fixed to a predetermined position, so that ride comfort felt by a passenger is improved, the operating speed of the lumbar supporting device is increased, the number of parts is reduced, and a simple construction is achieved, and thus manufacturing cost is reduced.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lumbar supporting device for a vehicle, comprising:
an actuator;
a lumbar plate slidably mounted to a support frame fixed to a seat back frame of the vehicle, and having a lumbar support part, wherein the lumbar support part is formed between upper and lower ends of the lumbar plate; and
a driving unit coupled to the actuator and pulling both upper and lower portions of the lumbar plate together along the support frame towards the lumbar support part, using power transmitted from the actuator;
wherein the lumbar support part is more elastic than a remaining portion of the lumbar plate, and
wherein the lumbar support part protrudes forwardly from the remaining portion of the lumbar plate relatively with respect to the support frame as the upper and lower ends of the lumbar plate move toward the lumbar support part along the support frame by the actuator, and
wherein the driving unit comprises:
a center wheel rotatably mounted to the lumbar plate under the lumbar support part thereof;
a driving cable connected at a first end thereof to the actuator and at a second end thereof engaged with an outer circumference of the center wheel and connected to the lower portion of the lumbar plate; and
a connecting unit connecting a portion of the outer circumference of the center wheel to the upper portion of the lumbar plate.

2. The lumbar supporting device as set forth in claim 1, further including the support frame connected to the seat back frame, wherein an upper portion of the support frame is slidably coupled to the upper portion of the lumbar plate and a lower portion of the support frame is slidably coupled to the lower portion of the lumbar plate, and wherein the center wheel is mounted to the support frame between the upper and lower portions of the lumber plate under the lumbar support part.

3. The lumbar supporting device as set forth in claim 2, wherein a bracket having a fastening part protruding therefrom is mounted to the support frame, and the center wheel has a shape of a cylinder which is open at a center thereof to be rotatably fitted to the fastening part.

4. The lumbar supporting device as set forth in claim 3, wherein the support frame includes a bending portion under the lumbar support part and the bracket is coupled thereto.

5. The lumbar supporting device as set forth in claim 3, wherein the driving cable is engaged with the bracket and the center wheel along the lumbar support part and reaches the lower portion of the lumbar plate.

6. The lumbar supporting device as set forth in claim 1, wherein the connecting unit is made of an elastic material.

7. The lumbar supporting device as set forth in claim 6, wherein the connecting unit comprises a coil spring.

8. The lumbar supporting device as set forth in claim 1, wherein the connecting unit includes:
a connecting wire coupled at a first end thereof to the portion of the outer circumference of the center wheel; and
a coil spring, a first end of which is coupled to a second end of the connecting wire, and a second end of which is connected to the upper portion of the lumbar plate.

9. The lumbar supporting device as set forth in claim 8, wherein the second end of the connecting wire is formed of a first hook and the coil spring includes the first end having a second hook which engages with the first hook of the connecting wire.

10. The lumbar supporting device as set forth in claim 1, wherein the actuator is provided to a side of the lumbar plate and secured to the seat back frame, and the driving cable passes through the side of the lumbar plate and the center wheel along the lumbar support part and reaches the lower portion of the lumbar plate.

11. The lumbar supporting device as set forth in claim 1, wherein a bracket having a fastening part protruding therefrom is mounted to the lumbar plate, and the center wheel has a shape of a cylinder which is open at a center thereof to be rotatably fitted to the fastening part.

* * * * *